May 29, 1934.   O. POST   1,960,827
MILK BOTTLE OPENER
Filed May 13, 1933   2 Sheets-Sheet 1

Inventor
Otto Post
Lynn H. Latta

By

Attorney

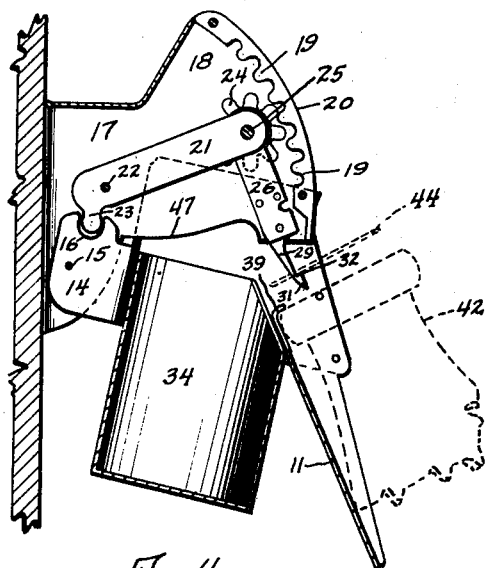

UNITED STATES PATENT OFFICE 1,960,827

MILK BOTTLE OPENER

Otto Post, Huron, S. Dak., assignor to Novelty Manufacturing Co., Huron, S. Dak.

Application May 13, 1933, Serial No. 670,989

10 Claims. (Cl. 65—47)

My invention relates to a milk bottle opener which will allow opening of a milk bottle simply and with the use of only one hand.

An object of my invention is to provide a milk bottle opener which is sanitary in that only a minimum of metal will touch the milk in the milk bottle.

A further object of my invention is to provide such an opener which can be readily mounted on any vertical wall of a restaurant or home, and in this way will be always in a certain fixed position so that it cannot be misplaced or removed.

Another object of my invention is to provide such an opener which will permit of a complete opening operation by removing the cap of a milk bottle and only by the use of one hand. This is an important function which will be explained more fully later.

Another object of my invention is to provide an opener which will remove the cap and then strip the cap from the removing point to allow it to drop into a convenient receptacle container within the opener, which receptacle can be removed after it has become filled with caps and emptied and then replaced for use again.

Another object of my invention is to provide an opener which is positive in operation and which will not get out of order.

A further object of my invention is to provide a milk bottle opener of simple and durable construction and which can be manufactured at a minimum cost.

Figure 1:
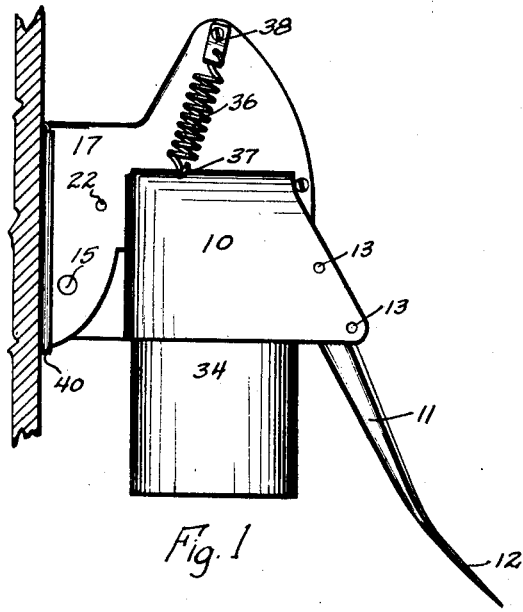
Figure 2:
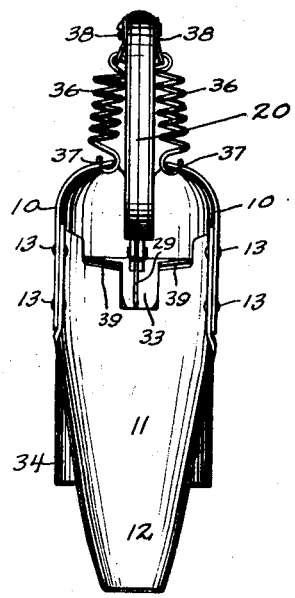
Figure 3:
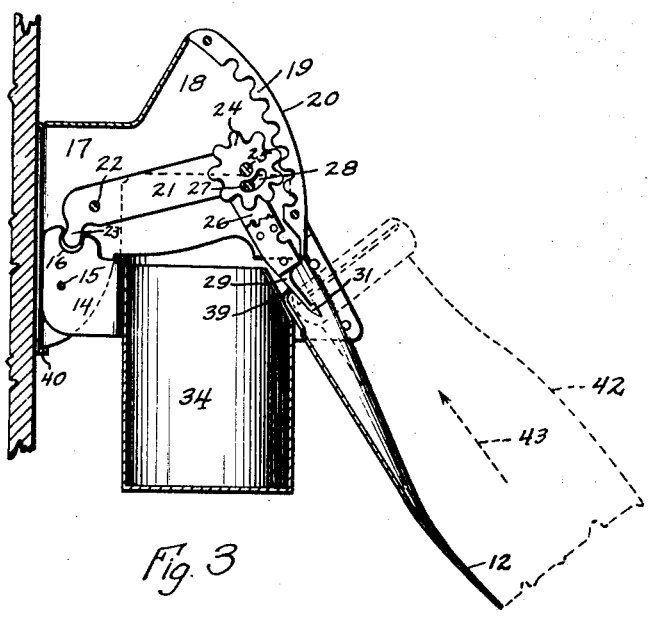

With these and other objects in view, my invention consists in the construction, arrangement and combination of the various parts of my device, whereby the objects contemplated are attained, as hereinafter more fully set forth, pointed out in my claims, and illustrated in the accompanying drawings, in which:

Figure 1 is a side elevation of the milk bottle opener in position on a vertical wall, Figure 2 is a front view thereof, Figure 3 is a sectional view taken centrally along the opener showing the functioning parts and showing a bottle in position, ready to be opened, Figure 4 is the next step of opening after Figure 3, Figure 5 is the final step showing the stripping action, Figure 6 is a plan view of the opener, Figure 7 is an enlarged detail plan view of the sprocket, and Figure 8 is a further enlarged detail view showing more clearly the pointed member, which enters the cap and the method of retaining the same before the stripping action takes place.

I have used the reference character 10 to designate generally the outer casing of the opener. Attached rigidly to the casing 10 is the member 11, which is adapted to receive the milk bottle. The member 11 includes the angled portion 12, which receives the curved portion of the milk bottle, as shown in Figure 3.

The member 11 is secured to the casing 10 by means of suitable rivets 13. The casing 10 includes an integral extension 14, which is pivoted at the pin 15.

The member 14 also includes the recessed portion 16.

The pin 15 is mounted within a further casing 17. The casing 17 includes the extension 18, in which is mounted the toothed rack 19. The rack 19 extends practically along the entire length of the arced portion 20 of the casing 18.

The lever arm 21 is pivoted at the pin 22, and the arm 21 terminates in the cam 23, which cam 23 is engaged in the recessed portion 16.

It will be understood that there are two levers 21, (see Figures 3 and 4), which are identical. These levers receive between them the sprocket 24, which is rotatably mounted on the pin 25.

Straddling the sprocket 24 is a pair of arms 26, which are also loosely and rotatably mounted on the same pin 25.

The arms 26 include between them the pin 27, which is received within the arcuate slot 28, which slot is cut away from the sprocket 24.

The outer ends of the arms 26 receive the pointed piercing member 29, which is received between the arms and riveted, as at 30. The lower end of the piercing member 29 includes the fine point 31 and the shoulder 32.

The member 11 includes the opening 33, which allows the point 31 to pass therethrough.

To catch the bottle caps after the stripping action, I provide the can 34, which is merely a cylindrical can, which is slipped into place between the arcuate flanges of the casing 10, and which will be held in place by means of their inherent spring tension.

The can 34 is also open at 35 in its forward portion to allow the point 29 to pass through.

The casing 10 is attached to springs 36 through small openings 37, and the other end of the springs 36 are attached to the members 38.

The member 11 is provided with the lips 39, which are adapted to act as a stop for the end of the milk bottle.

The entire device is attached to the wall by means of the small substantially C-shaped bracket 40. (See Figure 6.) The bracket 40 is first attached to the wall, and the flanges 41, which are bent outwardly from the frame 17, are slipped downwardly into the bracket 40. By virtue of this construction, the bracket 40 can be mounted to the wall by means of screws passing through suitable openings, and the entire device is slipped into position. This also provides a feature of permitting removal of the mechanism, if necessary. I will now explain how the device is used in opening a milk bottle.

Usually in restaurants, it is quite inconvenient for a waitress to open small milk bottles even if they have small tabs, which are quite frequently used at present. It is necessary for the waitress to use both hands, one hand to hold the bottle and the other to remove the cap with the fingers in the case of a tab type, or with some pointed instrument.

This is a bothersome process and takes some time. Furthermore a suitable instrument is not always within reach in some cases, and there is some time lost in searching for the same. A purpose of my invention is to provide a convenient opener for milk bottles, which will be fixed in one place and which will allow the cap to be dropped in a convenient receptacle. For instance if the waitress is holding a tray with one hand, she can pick up the milk bottle with the other and insert it in the opening device and by pressing against the bottle, the cap will be removed readily and stripped from the point, and the waitress can then place the bottle on the tray and proceed with the tray to her destination.

First the bottle 42 (see Figure 3) is placed within the member 11 and is forced upwardly in the direction of the arrow 43 until the upper rim of the bottle strikes the lips 39. As the bottle is forced upwardly, the point 31 will penetrate the cap. The waitress or operator then pushes against the bottle towards the wall, as indicated in Figure 4. As the bottle is pushed, the force is transmitted through the member 14, which rotates about the pin 15, and by virtue of the cam 23 with its engagement with the recess 16, the levers 21 will be thrown upwardly.

As the lever 21 is thrown upwardly, it carries the arms 26 with it, and the milk bottle cap 44 will be drawn upwardly, as shown in Figure 4.

As the bottle is pushed further inwardly against the wall, it will take the position as shown in Figure 5, and in this case the levers 21 are practically at the upper range of the engagement of the sprocket 24 with the toothed rack 19.

It will be seen in Figure 3 that when a bottle is first placed in position, and when the point 31 is in its receiving position, that the pin 27 which is attached to the arms 26, is in the lower end of the arcuate slot 28.

As the levers 21 are raised, the pin 27 will lie approximately at the mid-point of the arcuate opening 28, as shown in Figure 8. However as soon as the sprocket 24 is at its highest position, as shown in Figure 5, the pin 27 will be caught at the point 45 at the other end of the slot 28, since the direction of rotation of the sprocket 24 is as shown by the arrow 46.

Therefore just before the sprocket reaches its maximum height, this sprocket 24 will force the pin 27 rearwardly and thus the arms 26 will be also thrown rearwardly towards the wall, as shown in Figure 5.

As these arms pass in this direction, the point 31 is drawn upwardly between the portions 47 of the casings 17, and the bottle cap will then be stripped off of this point and will drop down by gravity into the container 34. The bottle is then released from the member 11, and the device will again return to the position, as shown in Figure 3, in other words its normal position.

It will be understood of course that the device returns to this position by virtue of the spring action of the springs 36.

As was previously explained, the container 34 when filled with caps, is merely pulled out and emptied and then replaced.

It will be seen that I have provided a milk bottle opener which will allow the opening of a bottle conveniently without resorting to any extra bother, and which is sanitary and provides means for depositing of the removed caps.

It will also be seen that I have provided a milk bottle opener which can be operated conveniently with one hand, thereby saving a great deal of time and effort.

It will be seen also that I have provided an opener of the type which can be readily attached to the wall and will always be in position, and which is of simple and durable construction and which can be manufactured at a reasonable cost.

Some changes may be made in the construction and arrangement of the parts of my invention without departing from the real spirit and purpose of my invention, and it is my intention to cover by my claims any modified forms of structure or use of mechanical equivalents, which may be reasonably included within their scope.

I claim as my invention:

1. A milk bottle opener comprising a frame, a toothed gear rack in the frame, a sprocket engaged with the gear rack, a hooked point pivotally attached about the sprocket, and means for causing elevation of the point when the sprocket is raised, including a lever attached to the sprocket, and a further lever positioned to force the said lever upwardly by cam action.

2. A milk bottle opener comprising a frame, a toothed gear rack in the frame, a sprocket engaged with the gear rack, a hooked point pivotally attached about the sprocket, and means for causing elevation of the point when the sprocket is raised, including a lever attached to the sprocket, and a further lever positioned to force the said lever upwardly by cam action, and means for receiving milk bottle caps.

3. A milk bottle opener comprising an upper frame including a hooked point, a sprocket attached to the hooked point, a gear rack arranged to cooperate with the sprocket, a pivoted upper lever rotatably attached to the sprocket, a lower frame including a bottle receiving member, an integral extension of the lower frame being pivoted to the upper frame and having a recessed cam, an extension of the upper lever arranged to be guided by the recessed cam to cause upward movement of the point when the bottle receiving member is forced inwardly to cause removal of a milk bottle cap.

4. A milk bottle opener comprising an upper frame including a hooked point, a sprocket attached to the hooked point, a gear rack arranged to cooperate with the sprocket, a pivoted upper lever rotatably attached to the sprocket, a lower frame including a bottle receiving member, an integral extension of the lower frame being pivoted to the upper frame and having a recessed cam, an extension of the upper lever arranged to be guided by the recessed cam to cause upward movement of the point when the bottle receiving member is forced inwardly to cause removal of a milk bottle cap, means for receiving the bottle caps attached within the lower frame, and tension means between the upper and lower frames.

5. A milk bottle opener comprising an upper frame including a hooked point, a sprocket attached to the hooked point, a gear rack arranged to cooperate with the sprocket, a pivoted upper lever rotatably attached to the sprocket, a lower frame including a bottle receiving member, an integral extension of the lower frame being pivoted to the upper frame and having a recessed cam, an extension of the upper lever arranged to be guided by the recessed cam to cause upward movement of the point when the bottle receiving member is forced inwardly to cause removal of a milk bottle cap, means for receiving the bottle caps attached within the lower frame, and tension means between the upper and lower frames, and stop means attached to the bottle receiving member comprising a pair of bent over lips.

6. A milk bottle opener comprising an upper frame including a hooked point, a sprocket attached to the hooked point, a gear rack arranged to cooperate with the sprocket, a pivoted upper lever rotatably attached to the sprocket, a lower frame including a bottle receiving member, an integral extension of the lower frame being pivoted to the upper frame and having a recessed cam, an extension of the upper lever arranged to be guided by the recessed cam to cause upward movement of the point when the bottle receiving member is forced inwardly to cause removal of a milk bottle cap, and means for stripping the caps so removed from the point.

7. A milk bottle opener comprising an upper frame including a hooked point, a sprocket attached to the hooked point, a gear rack arranged to cooperate with the sprocket, a pivoted upper lever rotatably attached to the sprocket, a lower frame including a bottle receiving member, an integral extension of the lower frame being pivoted to the upper frame and having a recessed cam, an extension of the upper lever arranged to be guided by the recessed cam to cause upward movement of the point when the bottle receiving member is forced inwardly to cause removal of a milk bottle cap, and means for stripping the caps so removed from the point, including a lost motion connection between the sprocket and the point.

8. A milk bottle opener comprising an upper frame including a hooked point, a sprocket attached to the hooked point, a gear rack arranged to cooperate with the sprocket, a pivoted upper lever rotatably attached to the sprocket, a lower frame including a bottle receiving member, an integral extension of the lower frame being pivoted to the upper frame and having a recessed cam, an extension of the upper lever arranged to be guided by the recessed cam to cause upward movement of the point when the bottle receiving member is forced inwardly to cause removal of a milk bottle cap, and means for stripping the caps so removed from the point, including a lost motion connection between the sprocket and the point, the upper frame being relatively narrow to allow stripping action when the cap is drawn therebetween.

9. A milk bottle opener comprising a frame including a pair of flanges, a wall mounted bracket for receiving the flanges, a toothed gear rack in the frame, a sprocket engaged with the gear rack, a hooked point pivotally attached about the sprocket, and levered means for forcing the sprocket upwardly.

10. A milk bottle opener comprising a frame including a pair of flanges, a wall mounted bracket for receiving the flanges, a toothed gear rack in the frame, a sprocket engaged with the gear rack, a hooked point pivotally attached about the sprocket, and levered means for forcing the sprocket upwardly, including an upper lever attached to the sprocket, a lower lever including a bottle receiving member adapted to force the upper lever upwardly when the bottle receiving member is forced inwardly against the mounted bracket.

OTTO POST.